Nov. 10, 1936. L. C. PERKINS 2,060,344
AUTOMOBILE LIFTING MECHANISM
Filed July 17, 1934 2 Sheets-Sheet 2
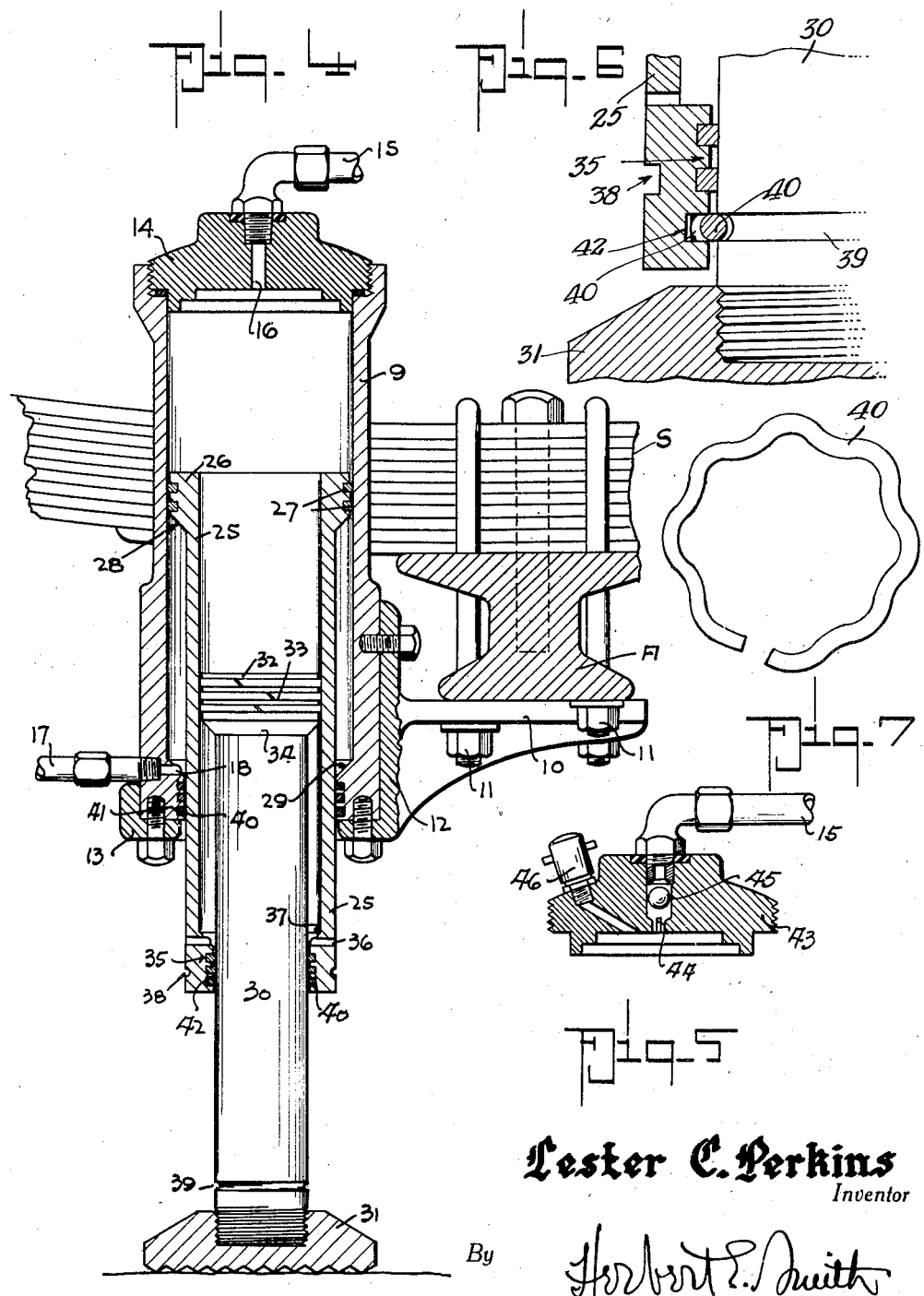
Lester C. Perkins
Inventor Patented Nov. 10, 1936

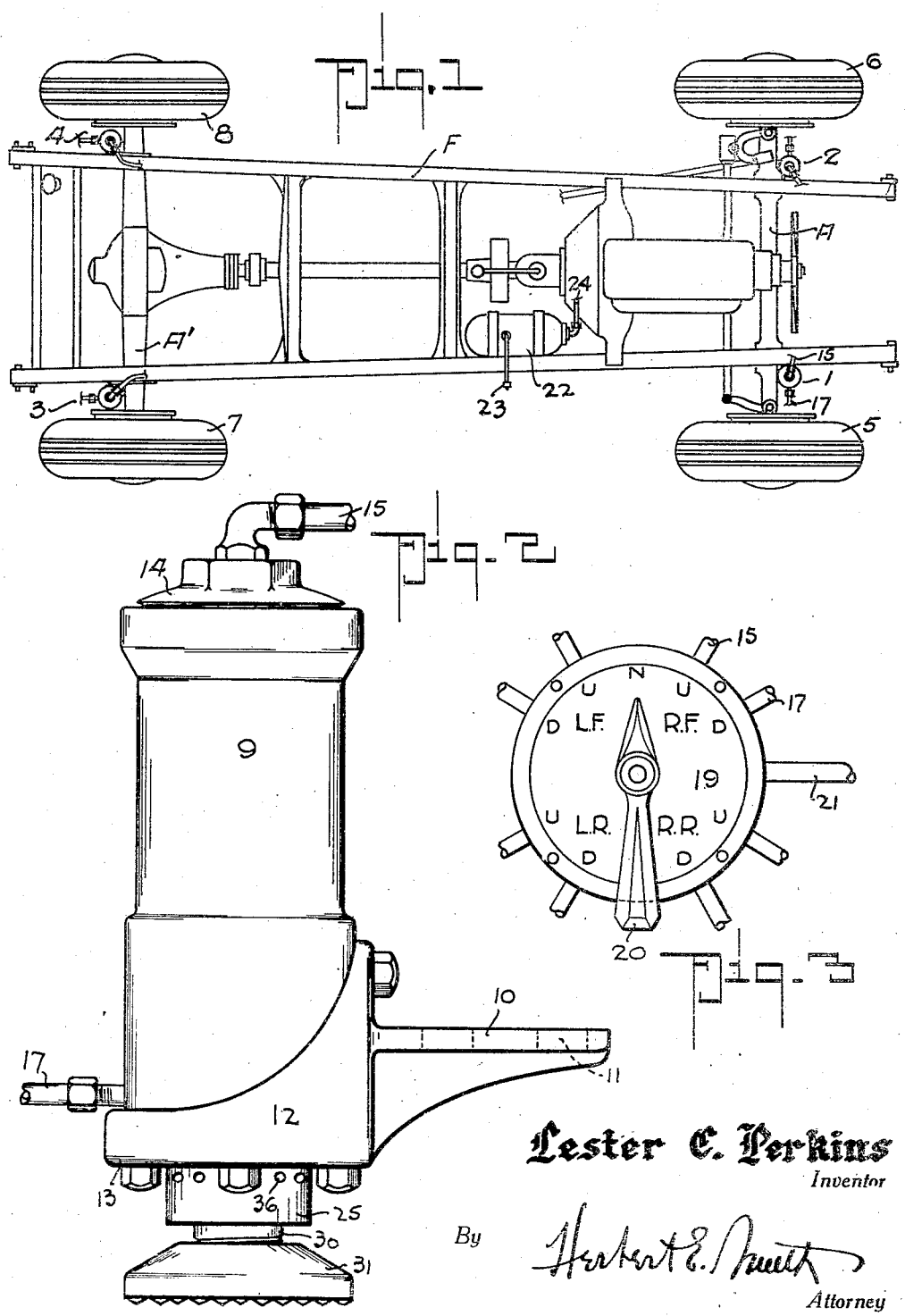

2,060,344

UNITED STATES PATENT OFFICE 2,060,344

AUTOMOBILE LIFTING MECHANISM

Lester C. Perkins, Spokane, Wash., assignor, by mesne assignments, to Quad Pneumatic Lift Company, Spokane, Wash., a corporation of New Jersey Application July 17, 1934, Serial No. 735,604

1 Claim. (Cl. 121—46)

My present invention relates to improvements in automobile lifting mechanism of the fluid pressure type, by means of which a selected part of the vehicle and a wheel, or a pair of wheels, may be elevated from the ground, as for instance, when preparing to repair a puncture or a blow-out in a wheel tire, or for other purposes.

The lifting mechanism involves the use of two pairs of fluid pressure operated jacks, one pair mounted on each axle of the vehicle, the four jacks being located adjacent the four wheels of the vehicle, and control means are provided, operable from the dash board or instrument board of the vehicle, whereby the desired wheel may be lifted from the ground by a selected jack, while the driver of the vehicle occupies the driver's seat.

The four fluid pressure operated jacks thus form parts of a lifting mechanism which may readily be mounted or installed as a permanent accessory of the vehicle and supported thereon; the mechanism is reliable and efficient in the performance of its functions, and may be manufactured and installed at reasonable cost; and with practically no cost for maintenance.

The invention consists in certain novel combinations and arrangements of parts for the performance of the above functions as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention, a slightly modified arrangement also being illustrated of the fluid pressure connections with the jacks.

Figure 1 is a plan view showing the chassis or frame, and other parts of an automobile equipped with the lifting mechanism of my invention.

Figure 2 is an enlarged view in elevation of one of the fluid pressure operated motors or jacks, with the telescoping plunger elevated or retracted and housed within its cylinder.

Figure 3 is a plan view showing the face plate of an air control valve device, by means of which any one, or two, of the jacks may be supplied with fluid pressure or compressed air.

Figure 4 is a vertical sectional view of one of the jacks or motors, with the telescoping plunger projected for the support of the elevated or lifted vehicle.

Figure 5 is a sectional detail view of a modified head of a jack-cylinder, showing air connections thereto, by means of which compressed air may be supplied to the jack from a remote source, as from the air pump at a gas station.

Figure 6 is an enlarged, detail sectional view showing the utility of one of the resilient retaining rings, holding the plunger bar uplifted.

Figure 7 is an enlarged detail plan view of one of the crimped, resilient, retaining rings.

In order that the general assembly and utility of parts may readily be understood I have shown in Figure 1 a typical frame F of an automobile, with the front axle A and the rear axle A', and in Figure 4 the spring S is shown in connection with the axle A.

In Figure 1 the four jacks are indicated, each as a whole by the numerals 1 adjacent the right front wheel; 2 adjacent the left front wheel; 3, adjacent the right rear wheel; and 4, adjacent the left rear wheel; and the wheels themselves are numbered 5, 6, 7, and 8.

Each jack is rigidly mounted on the frame to project its telescoping plunger downwardly, under fluid pressure, for the purpose of lifting the automobile, and fluid pressure also is utilized to lift the depressed telescoping plunger and return it to its cylinder or housing.

The cylinder 9 of each jack is supported by a step-bracket 10 that is bolted at 11 to a part of the frame or axle, the axle A being illustrated in Figure 4 as supporting the jack. The bracket, which is bolted to or attached beneath the axle A, is fashioned with an open top, cylindrical jacket 12, and this jacket, open at the bottom and top, is formed with a bottom, annular interior flange 13 that forms a seat for the cylinder 9.

The upper end of the cylinder is closed by means of a screw-head 14, to which an air pipe 15 is connected, which communicates through port 16 with the interior of the cylinder, for the introduction of compressed air to the cylinder when the telescoping plunger is to be projected or depressed. At the lower end of the cylinder another air pipe 17 is connected, which supplies compressed air through the lateral port 18 for elevating or lifting the depressed telescoping plunger. These two pipes 15 and 17 extend from the jack to a control valve-device 19 that includes a lever 20, and a main pipe 21 connects the valve device with the compressed air reservoir 22 that is suitably supported in desirable location on the frame or chassis of the vehicle.

By means of a connection 23 from the tank a supply of compressed air may be charged in the reservoir or tank from an air pump at a service station, garage, or other appropriate place; or by means of a connection 24 at the reservoir communication may be made to an air pump mounted on the chassis and operated in suitable manner from an operating part of the motor or engine of the vehicle. In any event, an ample supply of compressed air is maintained in the reservoir, on which to draw, in case of an emergency, or at other times when it is desired or necessary to lift the automobile. One main, or supply pipe connects the reservoir with the valve device, and two air pipes from the valve-device, as 15 and 17, communicate with each of the cylinders of the several jacks. The valve lever is pointing, in Figure 3, to the N or neutral point of the device, and the face plate is provided with the letters U and D, indicating up and down, for the various jacks. The valve device of course is controlled by the lever to place the reservoir in communication with the cylinder jack through the pipe 15 when the vehicle is to be lifted up; and to place the reservoir in communication with the lower part of the cylinder (port 18) through pipe 17 when the uplifted vehicle is to be lowered or moved downwardly, thus employing compressed air in both movements of the telescoping plunger of the jack.

This telescoping plunger includes a tubular piston 25 located in the cylinder 9 and provided with an upper, exterior head 26 with packing rings 27 to make a close fit with the bore of the cylinder, and the lower, annular face 28 of this head is beveled as indicated in Figure 4, and adapted to close the inlet port 18 if and when the tubular piston is entirely projected to its limit.

The downward movement or projection of the tubular cylinder is limited by contact of the head 28 with a complementary annular, interior flange 29 of the cylinder, which is also provided with packing rings for a close fit of the tubular piston 25, and the annular space between the cylinder and the tubular piston provides an expansion chamber for the compressed air entering port 18 to accomplish the upstroke of the telescoping plunger.

A solid cylindrical plunger-bar 30 is provided at its lower end with a base or foot 31, and the upper enlarged head 32 of this bar, which reciprocates in the tubular piston is provided with packing rings 33 for a close fit. The under face 34 of this head 32 is also beveled, and the inner annular flange 35 at the lower end of the tubular piston is beveled at 37 to provide a stop, for abutment of the head 32, in limiting the downward movement or down stroke of the plunger bar. An annular expansion chamber is also formed between the plunger bar and the tubular piston, and a port or ports 36 extend through the wall of the tubular piston, just above the flange 35, in position for alinement or registration with the port or ports 18 of the cylinder. The port 36 registers with port 18 after air pressure through port 18 has lifted the tubular piston to the end of its upstroke; then the flow of compressed air through port 36 to the expansion chamber below head 32 in the tubular piston is imposed against the face 34 of head 32 to lift the plunger bar in the tubular piston until the top face of the head 32 is flush with the top edge of the head 26, and the foot piece or base block 31 is lifted snug against the lower end of the tubular piston. Thus by proper manipulation of the air lever 20, air under pressure is admitted to the upper end of the cylinder 9 for projecting the telescopic plunger on its downstroke for elevating the vehicle, and the pressure is maintained in the cylinder and tubular piston while the vehicle is in elevated position. For lowering the vehicle from its elevated position the air under pressure may be gradually vented from the cylinder 9, thereby lowering the vehicle by gravity, then, or simultaneously with the venting of the cylinder, air pressure may be introduced to the successive expansion chambers through ports 18 and 36 to positively lift the telescoping members of the plunger to retracted or housed position. In some instances, air under pressure in the two annular expansion chambers may be utilized to hold the two parts of the telescoping plunger in uplifted position.

As shown in Figure 4 I utilize a retaining ring 40 seated in a groove 41 of the flange 29 and a similar ring 40 is seated in a groove 42 of the flange 35. These rings are of resilient metal, and they are crimped so that they may be expanded back into their annular seats or grooves by the full peripheries of the tubular piston and the plunger bar respectively. The tubular piston 25 has an annular exterior groove 38 and the plunger bar 30 has an annular exterior groove 39, into which these expanded retaining rings contract when the respective grooves 38 and 39 reach the rings 40, and the contracted rings, by occupying grooves 41—38 and grooves 42—39, hold the respective members 25 and 30 in uplifted position. At the initiation of the downstroke of each of these members the retaining rings are expanded into their seats to free the members, and they are ready to again contract when the exterior grooves again reach these points of location of the retaining rings.

In Figure 5 a modified head 43 for the cylinder 9 is illustrated with the air pipe 15 connected thereto for supply of compressed air from the reservoir and valve device, and the inlet port 44 is provided with an upwardly closing ball valve 45. At 46 an automatic valve device is provided in the head, and a hose and cap, from any suitable air pump, as at a gas station, or other source of supply, is connected to this automatic valve device for supplying compressed air to the jack. Under these conditions, the ball valve is closed to prevent passage of compressed air through pipe 15. In some instances, this automatic valve device 46 may be utilized as a vent device for the cylinder 9 to permit venting of the cylinder, while the closed ball valve 45 shuts off flow of air to pipe 15.

Having thus fully described my invention what I claim as new and desire to secure by Letters Patent is:

In an automobile lifting mechanism, the combination with an outer cylinder having an inner annular flange at its lower end and a resilient retaining ring seated in a groove in said flange, of a telescopic tubular plunger having an upper exterior flange forming a piston head and an exterior annular groove at its lower end, an inner annular flange at the lower end of the tubular plunger and a resilient retaining ring seated in a groove in said flange, a plunger bar slidable in the tubular plunger and having an annular exterior groove at its lower end for co-action with the last mentioned ring, and an enlarged piston head at the upper end of said bar.

LESTER C. PERKINS.